US010310161B2

(12) United States Patent
Adachi (10) Patent No.: US 10,310,161 B2
(45) Date of Patent: Jun. 4, 2019

(54) PLANAR ILLUMINATION DEVICE (71) Applicant: MINEBEA MITSUMI Inc., Nagano (JP)

(72) Inventor: Kazumasa Adachi, Shizuoka (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/825,281

(22) Filed: Nov. 29, 2017

(65) Prior Publication Data
US 2018/0156956 A1 Jun. 7, 2018

(30) Foreign Application Priority Data

Dec. 2, 2016 (JP) .................................. 2016-235377
Aug. 25, 2017 (JP) .................................. 2017-162311

(51) Int. Cl.
G02B 6/02 (2006.01)
F21V 8/00 (2006.01)

(52) U.S. Cl.
CPC ......... G02B 6/005 (2013.01); G02B 6/02209 (2013.01)

(58) Field of Classification Search
CPC .................................................... G02B 6/005
(Continued)

(56) References Cited
U.S. PATENT DOCUMENTS 9,529,138 B2 * 12/2016 Kim .................. G02F 1/133512
2010/0182535 A1 7/2010 Mifune et al.
(Continued)

FOREIGN PATENT DOCUMENTS

JP 2005-078917 A 3/2005
JP 2009-080947 A 4/2009
JP 2013-015637 A 1/2013

OTHER PUBLICATIONS

Notification of Reasons for Refusal dated Feb. 25, 2019 for corresponding Japanese Application No. 2017-162311 and English translation.

Primary Examiner — Michael G Lee
Assistant Examiner — David Tardif
(74) Attorney, Agent, or Firm — Pearne & Gordon LLP (57) ABSTRACT A planar illumination device according to an embodiment includes: a light source; a light guide plate including a light incident side surface on which the light source is arranged; a housing that includes side walls surrounding outer circumferential surfaces of the light source and the light guide plate; a first light blocking sheet that is adhered to an outer side surface and a top end surface of a side wall opposed to the light source among the side walls and that covers the top end surface, a top surface of the light source, and part of a top surface of the light guide plate; and a second light blocking sheet that is adhered to top end surfaces of the side walls other than the side wall to which the first light blocking sheet is adhered and that covers at least the top end surfaces. The first light blocking sheet includes a first light blocking layer that extends from the outer side surface of the side wall to which the first light blocking layer is adhered toward a side wall opposed to the side wall to which the first light blocking layer is adhered; and a second light blocking layer that extends from part of a top surface of the first light blocking layer toward a side wall opposed to the side wall on which the first light blocking layer is adhered.

13 Claims, 8 Drawing Sheets (58) Field of Classification Search
USPC .......................................................... 362/607
See application file for complete search history.

(56) References Cited

U.S. PATENT DOCUMENTS

| | | | | |
|---|---|---|---|---|
| 2011/0273906 A1* | 11/2011 | Nichol | ................. | G02B 6/0076 |
| | | | | 362/607 |
| 2013/0215644 A1* | 8/2013 | Takada | ................. | G02B 6/0088 |
| | | | | 362/607 |
| 2014/0111743 A1* | 4/2014 | Takemura | ................. | F21S 2/00 |
| | | | | 349/64 |
| 2015/0015798 A1* | 1/2015 | Masuda | ................. | G02F 1/1333 |
| | | | | 348/794 |

* cited by examiner

PLANAR ILLUMINATION DEVICE

CROSS-REFERENCE TO RELATED APPLICATION(S)

The present application claims priority to and incorporates by reference the entire contents of Japanese Patent Application No. 2016-235377 filed in Japan on Dec. 2, 2016 and Japanese Patent Application No. 2017-162311 filed in Japan on Aug. 25, 2017.

BACKGROUND OF THE INVENTION

1. Field of the Invention

The present invention generally relates to a planar illumination device.

2. Description of the Related Art

A conventional planar illumination device that includes light emitting diodes (LEDs) arranged on a side surface of a light guide plate on which light is incident and includes a housing having a side wall surrounding outer circumferential surfaces of the LEDs and the light guide plate is known. In the planar illumination device, a light blocking sheet that defines an effective area of an output surface of the light guide plate is adhered to a top end surface of a side wall.

In the planer illumination device according to the above-described conventional technology, in order to realize both a slim bezel and an increase in adhesive strength between the light blocking sheet and the housing (frame), for example, the light blocking sheet is formed by layering various materials. For this reason, depending on change in the environment in which the device is used, wrinkles may occur in an optical sheet that is adhered to both the housing and the light blocking sheet, which hinders maintaining the illumination characteristics for a long time.

SUMMARY OF THE INVENTION

A planar illumination device according to an embodiment of the present invention includes: a light source; a light guide plate including a light incident side surface on which the light source is arranged; a housing that includes side walls surrounding outer circumferential surfaces of the light source and the light guide plate; a first light blocking sheet that is adhered to an outer side surface and a top end surface of a side wall opposed to the light source among the side walls and that covers the top end surface, a top surface of the light source, and part of a top surface of the light guide plate; and a second light blocking sheet that is adhered to top end surfaces of the side walls other than the side wall to which the first light blocking sheet is adhered and that covers at least the top end surfaces. The first light blocking sheet includes a first light blocking layer that extends from the outer side surface of the side wall to which the first light blocking layer is adhered toward a side wall opposed to the side wall to which the first light blocking layer is adhered; and a second light blocking layer that extends from part of a top surface of the first light blocking layer toward a side wall opposed to the side wall on which the first light blocking layer is adhered.

DETAILED DESCRIPTION OF THE PREFERRED EMBODIMENTS

Planar illumination devices according to embodiments will be described below. The embodiments described below do not limit the invention. The relation in size and ratio between the components illustrated in the drawings may be different from actual ones. The relation in size and ratio between the components may be different among the drawings.

Figure 1:
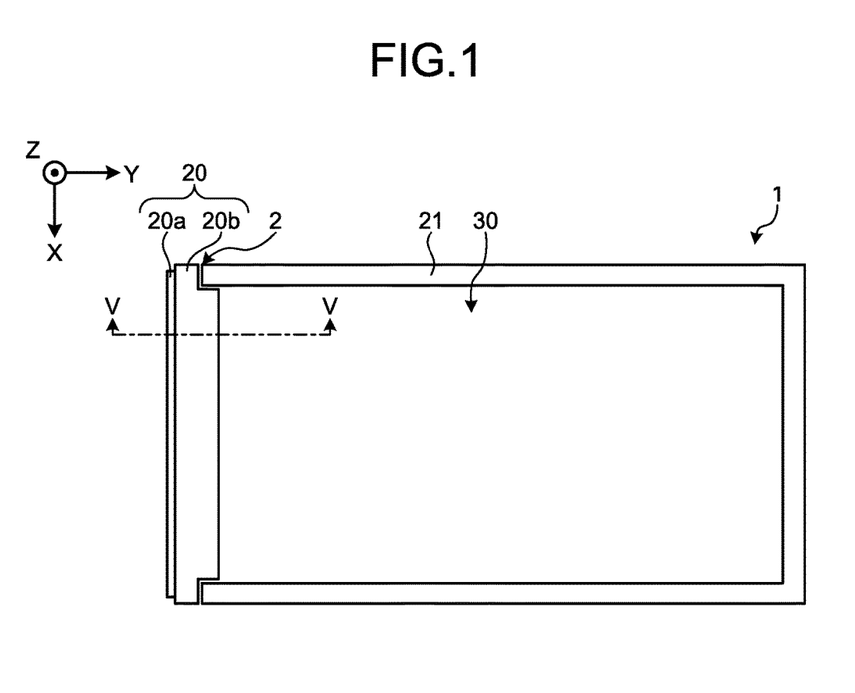
FIG. 1 is a plane view illustrating exemplary appearance of a planar illumination device according to an embodiment.
Figure 2:
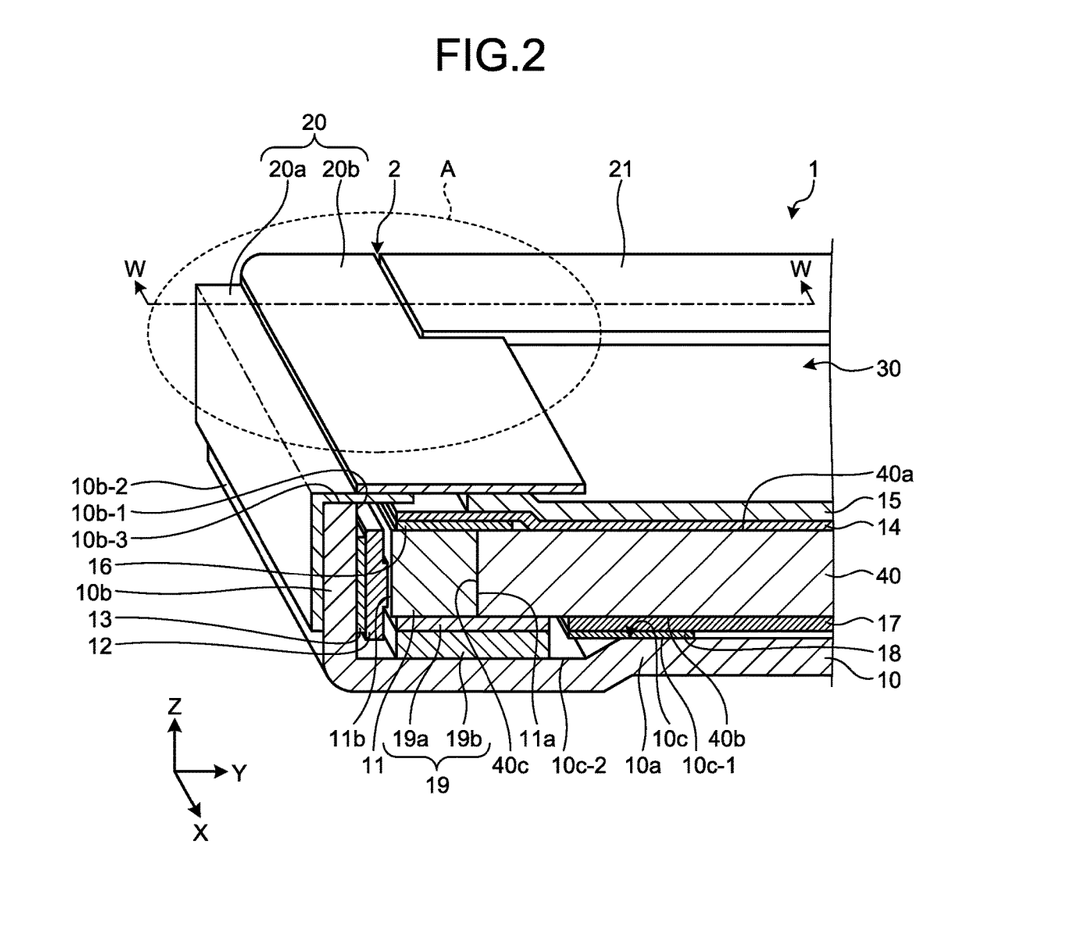
FIG. 2 is a cross-sectional perspective view taken along the V-V line illustrated in FIG. 1.
Figure 3:
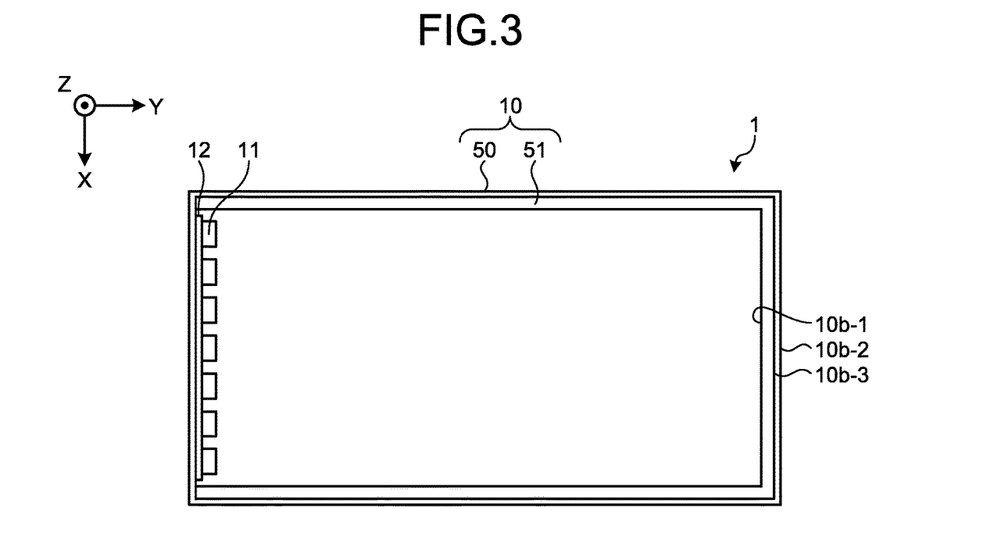
FIG. 3 is a plane view illustrating a housing according to the embodiment.

An exemplary configuration of a planar illumination device 1 according to the embodiment will be described with reference to FIGS. 1, 2 and 3. FIG. 1 is a plane view illustrating an exemplary appearance of the planar illumination device 1 according to the embodiment. FIG. 2 is a cross-sectional perspective view taken along the V-V line illustrated in FIG. 1. FIG. 3 is a plane view illustrating a housing 10 according to the embodiment.

In order to provide easy-to-understand explanation, FIGS. 1, 2 and 3 illustrate a three-dimensional orthogonal coordinate system in which a surface from which light is output is in the positive direction. The orthogonal coordinate system may be illustrated in other drawings used for the following descriptions.

As illustrated in FIG. 1, the planar illumination device 1 according to the embodiment outputs light from an effective area 30 that is an area not covered with a first light blocking sheet 20 and a second light blocking sheet 21 on an output surface 40a of a light guide plate 40 (see FIG. 2). In other words, in the planar illumination device 1, the first light blocking sheet 20 and the second light blocking sheet 21 define the effective area 30 of the output surface 40a of the light guide plate 40. The first light blocking sheet 20 includes a first light blocking layer 20a and a second light blocking layer 20b (see FIG. 2).

The planar illumination device 1 according to the embodiment is used as, for example, a backlight of a liquid crystal display device. The liquid crystal display device is used in, for example, an information portable terminal, such as a smartphone or a tablet.

A slit 2 is formed between the first light blocking sheet 20 and the second light blocking sheet 21. Details of the first light blocking sheet 20, the second light blocking sheet 21 and the slit 2 will be described below.

As illustrated in FIG. 2, the planar illumination device 1 includes a housing 10, light emitting diodes (LEDs) 11, a flexible printed circuit (FPC) 12, a fixing member 13, a diffusion sheet 14, a prism sheet 15, a fixing member 16, a reflection sheet 17, a fixing member 18, a connecting member 19 and the light guide plate 40.

The housing 10 houses the LEDs 11, the FPC 12, the fixing member 13, the diffusion sheet 14, the prism sheet 15, the fixing member 16, the reflection sheet 17, the fixing member 18, the connecting member 19 and the light guide plate 40. The housing 10 has a bottom 10a and side walls 10b.

The bottom 10a is a part extending along a back surface 40b of the light guide plate 40. The bottom 10a includes a bottom surface 10c. The bottom surface 10c includes a first plane surface 10c-1 and a second plane surface 10c-2 lower than the first plane surface 10c-1 by one step to the Z-axis negative direction side.

The side wall 10b is a part rising from the bottom 10a to the Z-axis positive direction (the direction in which light is output) from the bottom 10a along the longitudinal side of a light incident side surface 40c of the light guide plate 40. The side wall 10b includes an inner side surface 10b-1, an outer side surface 10b-2 and a top end surface 10b-3.

As illustrated in FIG. 3, the above-described housing 10 includes a housing body 50 in a shape like a rectangular prism and frame member 51 that is provided along the inner side surface of the housing body 50 and that is U-shaped in its cross sectional view. The housing body 50 has large rigidity and is formed of, for example, a stainless metal plate. The frame member 51 is made of, for example, resin.

In the embodiment, provision of the frame member 51 on the inner side surfaces of the housing body 50 excluding the inner side surface opposed to the LEDs 11 increases the thickness of the side walls 10b excluding the side wall 10b of the housing 10 opposed to the LEDs 11 to a thickness higher than that of the side wall 10b opposed to the LEDs 11 of the housing 10.

The side wall 10b of the housing 10 opposed to the LEDs 11 consists of a side wall of the housing body 50, the side walls 10b of the housing 10 other than the side wall 10b opposed to the LEDs 11 consist of side walls of the housing body 50 and side walls of the frame member 51. In other words, the width of the top end surfaces 10b-3 of the side walls 10b of the housing 10 other than the side wall 10b opposed to the LEDs 11 of the housing 10 is the sum of the thickness of the side wall of the housing body 50 and the thickness of the side wall of the frame member 51.

FIG. 2 will be referred back here. The LED 11 is a dot light source. The LED 11 is, for example, a pseudo white LED including a blue LED and an yellow fluorescent material. The LED 11 is formed into an approximately rectangular cuboid shape as a whole. The LED 11 has a pair of main surfaces 11a and 11b opposed to each other in the Y-axis direction and one of the main surfaces (light emitting surface) 11a makes contact with the light incident side surface 40c of the light guide plate 40 on the Y-axis positive direction side.

In the embodiment, the LEDs 11 are arranged at equal intervals in the X-axis direction along the light incident side surface 40c of the light guide plate 40. The LEDs 11 need not necessarily be arranged at equal intervals, that is, the LEDs 11 may be arranged at unequal intervals. The LEDs 11 emits light from the light emitting surface 11a on the Y-axis positive direction side toward the light incident side surface 40c of the light guide plate 40. The LED 11 is an exemplary light source.

The FPC 12 has a pair of main surfaces opposed to each other in the Y-axis direction. One of the main surfaces makes contact with the main surface 11b opposite to the other light emitting surface 11a of the LED 11. The FPC 12 is provided with a circuit for supplying power to the LEDs 11.

The fixing member 13 fixes the FPC 12 to the inner side surface 10b-1 of the side wall 10b in the housing 10. The fixing member 13 is, for example, a double-sided adhesive tape. One of the surfaces of the fixing member 16 is adhered to one of the main surfaces of the FPC 12 and the other surface of the fixing member is adhered to the inner side surface 10b-1.

The light guide plate 40 guides light from the LEDs 11 to enable planar illumination. The light guide plate 40 contains, for example, a translucent material, such as polycarbonate resin or acrylate resin. The light guide plate 40 includes a pair of main surfaces 40a and 40b opposed to each other in the Z-axis direction, a light incident side surface (a surface on which light is incident) 40c that is a side surface on the side on which the LEDs 11 are arranged, and a side surface (not illustrated) on the side opposite to the light incident side surface 40c. Light emitted by the LEDs 11 is incident on the light incident side surface 40c.

The main surface 40a on the Z-axis positive direction side that is one of the two main surfaces 40a and 40b is an output surface (light emitting surface) from which the light entering from the light incident side surface (the light emitted by the LEDs 11) is output. The other main surface 40b on the Z-axis negative direction side is the reflection surface (back surface) on which the light that enters the light guide plate 40 reflects.

In other words, for example, a light path change pattern consisting of multiple dots is formed on the other main surface 40b. The light path change pattern changes the direction in which the light traveling through the light guide plate 40 travels and the light is output from the main surface 40a. In the following descriptions, "the main surface 40a that is one of the main surfaces" is referred to as "the output surface 40a" and the "the other main surface 40b" is referred to as "the reflection surface 40b".

The diffusion sheet 14 is arranged such that the diffusion sheet 14 covers the output surface 40a of the light guide plate 40 and the diffusion sheet 14 diffuses the light that is output from the output surface 40a. The prism sheet 15 is arranged on the diffusion sheet 14 on the opposite side to the light guide plate 40. The prism sheet 15 controls distribution of the light diffused by the diffusion sheet 14 and the light having undergone the light distribution control is output from the prism sheet 15.

The fixing member 16 is, for example, a double-sided adhesive tape. Part of one of the surfaces of the fixing member 16 is adhered to part of the output surface 40a of the light guide plate 40 and the top surfaces (the surface on the Z-axis positive direction side) of the LEDs 11. Part (the end on the side of the light incident side surface 40c) of the diffusion sheet 14 overlaps and is adhered to the other surface of the fixing member 16. Arranging the fixing member 16 between the light guide plate 40 and the diffusion sheet 14 raises the diffusion sheet 14 and the prism sheet 15 on the side of the light incident side surface 40c to the Z-axis positive direction side. In other words, the end of the prism sheet 15 on the side of the light incident side surface 40c overlaps the fixing member 16 via the diffusion sheet 14 and accordingly the end of the prism sheet 15 on the side of the light incident side surface 40c is raised by the thickness of the fixing member 16 so that the top surface of the end is positioned at a level approximately equal to the level at which the top surface of the first light blocking layer 20a to be described below is positioned.

The reflection sheet 17 is arranged on the reflection surface 40b of the light guide plate 40. The reflection sheet 17 reflects the light leaked from the reflection surface 40b of the light guide plate 40 and returns the light to the light guide plate 40 again. The fixing member 18 is, for example, a double-sided adhesive tape. The fixing member 18 is adhered to part of the reflection sheet 17 and the other surface of the fixing member 18 is adhered to the first plane surface 10c-1 of the housing 10. Accordingly, the reflection sheet 17 is fixed on the bottom surface 10c of the housing 10.

The connecting member 19 is arranged between the reflection surface 40b of the light guide plate 40 and the LEDs 11 on the side of the light incident side surface 40c and the second plane surface 10c-2 of the housing 10. The connecting member 19 optically and structurally connects the light guide plate 40 and the LED 11. Specifically, the connecting member 19 connects the light incident side surface 40c of the light guide plate 40 and the light emitting surface 11a of the LED 11. The connecting member 19 is arranged such that the connecting member 19 continuously covers the reflection surface 40b of the light guide plate 40 on the side of the light incident side surface 40c and the surface of the LED 11 on the Z-axis negative direction side.

The connecting member 19 is, for example, a rectangular single-sided adhesive tape having an adhesive surface on one side. The connecting member 19 includes an adhesive layer (adhesive) 19a and a base 19b. The base 19b is, for example, polyethylene terephthalate (PET) and the adhesive layer 19a is, for example, silicon or acryl. Thus, the reflection surface 40b of the light guide plate 40 and the bottom surfaces (surface on the Z-axis negative direction side) of the LEDs 11 are adhered flat to the connecting member 19.

As illustrated in FIG. 2, the first light blocking sheet 20 includes the first light blocking layer 20a and the second light blocking layer 20b. In other words, the first light blocking sheet 20 is a double-layered light blocking sheet including the first light blocking layer 20a and the second light blocking layer 20b.

The first light blocking layer 20a extends from the outer side surface 10b-2 of the side wall 10b to which the first light blocking layer 20a is adhered toward the side wall 10b opposed to the side wall 10b. Specifically, in the embodiment, the first light blocking layer 20a covers the outer side surface 10b-2 of the side wall 10b and the LEDs 11 in the width direction in the X-axis direction from the outer side surface 10b-2 of the side wall 10b opposed to the surfaces of the LEDs 11 along the X-axis direction to part of the top surfaces of the LEDs 11. The first light blocking layer 20a covers the end of the diffusion sheet 14 on the side of the light incident side surface 40c. In other words, the upper surface of the first light blocking layer 20a is positioned at a level approximately equal to the level at which the top surface of the raised prism sheet 15 is positioned.

The first light blocking layer 20a is, for example, a single-sided adhesive tape having an adhesive surface on one surface. The adhesive surface is adhered to the outer side surface 10b-2 of the side wall 10b and the top end surface 10b-3. Accordingly, it is possible to prevent the adhesive surface from being exposed from the outer side surface 10b-2 of the side wall 10b and improve handling the planar illumination device 1.

The second light blocking layer 20b extends from part of the top surface of the first light blocking layer 20a toward the side wall 10b opposed to the side wall 10b to which the first light blocking layer 20a is adhered. Specifically, the second light blocking layer 20b covers from part of the top surface of the first light blocking layer 20a toward part of the light guide plate 40 in the width direction of the first light blocking layer 20a and the light guide plate 40 in the X-axis direction. A cutout in which the end of the second light blocking sheet 21 on the Y-axis negative direction side is housed is formed at the corner of the second light blocking layer 20b on the Y-axis positive direction side.

The second light blocking layer 20b is, for example, a double-sided adhesive tape having adhesive surfaces on both sides. One of the adhesive surfaces on the Z-axis negative direction side is adhered to the top end surface 10b-3 of the side wall 10b, the first light blocking layer 20a and the prism sheet 15 and the other adhesive surface on the Z-axis positive direction side is adhered to the liquid crystal display device.

As illustrated in FIG. 2, on (on the inner side of) the side wall 10b of the housing 10 along the X-axis direction, a part of the first light blocking layer 20a of the first light blocking sheet 20 extending to the Y-axis positive direction side covers the fixing member 13, the FPC 12 and part of the top surfaces of the LEDs 11.

On the side wall 10b of the housing 10 along the X-axis direction, the part of the second light blocking layer 20b of the first light blocking sheet 20 extending to the Y-axis positive direction side covers part of the first light blocking layer 20a, the LEDs 11, and part of the top surface of the light guide plate 40.

In the first light blocking sheet 20 that is adhered to the top end surface 10b-3 of the side wall 10b of the housing 10 along the Y-axis direction, the second light blocking layer 20b covers the top surface of the first light blocking layer 20a.

In other words, in the first light blocking sheet 20 that is formed on the side of the side wall 10b of the housing 10 along the X-axis direction, the area where the first light blocking layer 20a and the second light blocking layer 20b overlap each other is the area where the first light blocking layer 20a covers the fixing member 13, the FPC 12 and part of the top surfaces of the LEDs 11.

The second light blocking sheet 21 is adhered to the side walls 10b other than the side wall 10b to which the first light blocking layer 20a is adhered and thus covers the top end surface 10b-3 of the side wall 10b and the outer circumference of the light guide plate 40.

The second light blocking sheet 21 is a double-sided adhesive tape having adhesive surfaces on both sides. One of the adhesive surfaces on the Z-axis negative direction side is adhered to the top end surface 10b-3 of the side wall 10b and the outer circumference of the prism sheet 15 and the other adhesive surface on the Z-axis positive direction side is adhered to the liquid crystal display device.

Figure 4:
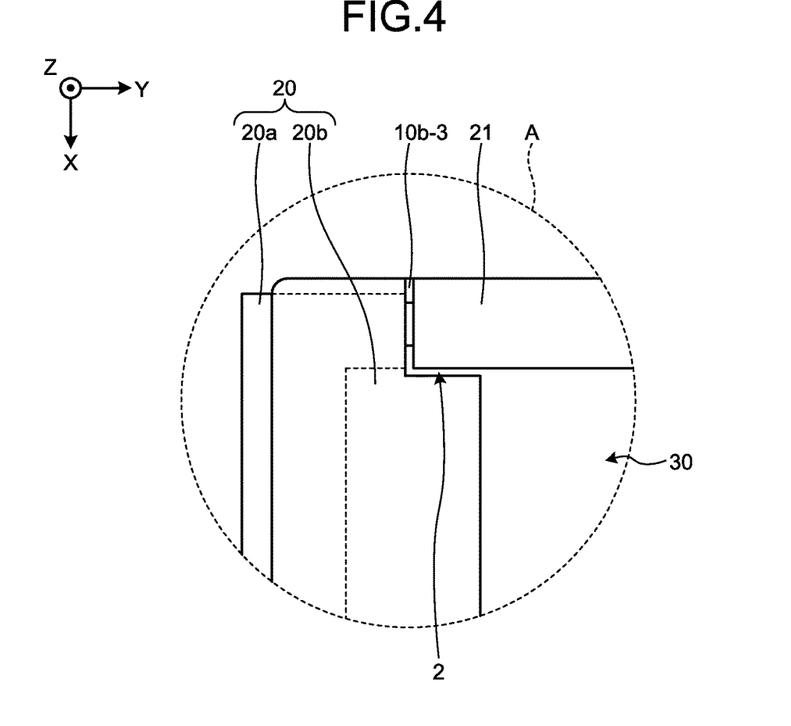
FIG. 4 is an enlarged plane view of the area A illustrated in FIG. 2.

With reference to FIG. 4, the slit 2 that is formed between the first light blocking sheet 20 and the second light blocking sheet 21 that are adjacent to each other will be described. FIG. 4 is an enlarged diagram of the area A illustrated in FIG. 2.

As illustrated in FIG. 4, the slit 2 is formed between the first light blocking sheet 20 and the second light blocking sheet 21 that are adjacent to each other. Specifically, the slit 2 is formed by housing the end of the second light blocking sheet 21 in the cutout of the second light blocking layer 20b with a given space left. The slit 2 is approximately L-shaped, that is, crank-shaped, when viewed from the top.

Figure 5:
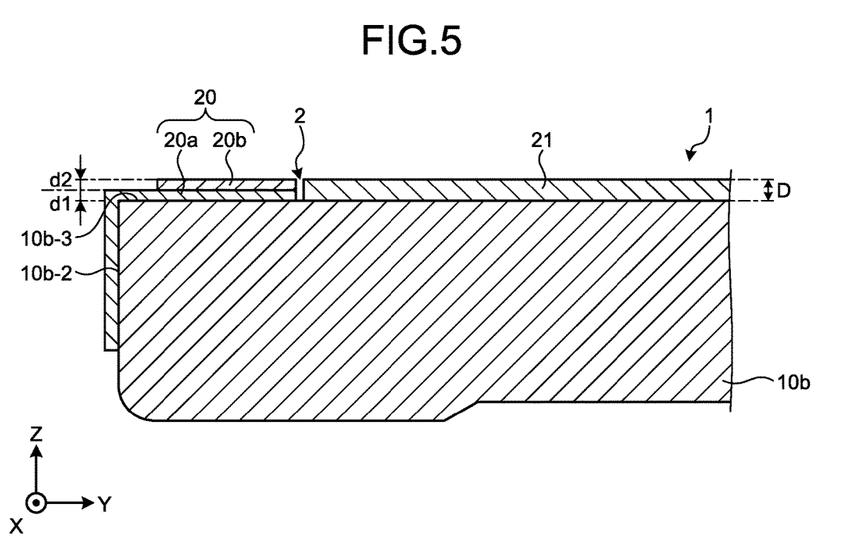
FIG. 5 is a cross-sectional schematic view taking along the W-W line illustrated in FIG. 2.

With reference to FIG. 5, the first light blocking sheet 20 and the second light blocking sheet 21 that are adhered to the top end surface 10b-3 of the side wall 10b of the housing 10 will be described. FIG. 5 is a cross-sectional schematic view taken along the W-W line illustrated in FIG. 2. The components having the same functions as those of the components illustrated in FIG. 2 will be denoted with the same reference numbers as those illustrated in FIG. 2 and descriptions thereof will be omitted.

As illustrated in FIG. 5, the first light blocking sheet 20 has a double-layered structure including the first light blocking layer 20a and the second light blocking layer 20b on the side wall 10b of the housing 10 along the Y-axis direction. A thickness d1 of the first light blocking layer 20a and a thickness d2 of the second light blocking layer 20b may be equal to each other. Alternatively, the thickness d1 of the first light blocking layer 20a may be smaller than or larger than the thickness d2 of the second light blocking layer 20b.

The second light blocking sheet 21 has a single-layered structure on the side wall 10b of the housing 10 along the Y-axis direction and on the side wall 10b along the X-axis direction. A thickness D of the second light blocking sheet 21 is approximately equal to the thickness of the first light blocking sheet 20 on the side wall 10b on which the first light blocking layer 20a and the second light blocking layer 20b overlap each other. In other words, the thickness D of the second light blocking sheet 21 is approximately equal to the sum of the thicknesses of the first light blocking layer 20a and the second light blocking layer 20b (d1+d2).

As the second light blocking sheet 21 has the thickness approximately equal to that of the area where the first light blocking layer 20a and the second light blocking layer 20b overlap each other, the liquid crystal display device is attached to the second light blocking layer 20b and the second light blocking sheet 21 approximately in parallel. As described above, the first light blocking sheet 20 has a double-layered structure including the first light blocking layer 20a that is a single-sided adhesive tape and the second light blocking layer 20b that is a double-sided adhesive tape and the second light blocking sheet 21 has a single-layered structure including only a single-sided adhesive tape. In other words, the first light blocking sheet 20 and the second light blocking sheet 21 have different layer structures.

As described above, in the planer illumination device according to the embodiment, the slit 2 is formed between the first light blocking sheet 20 having a double-layered structure and the second light blocking sheet 21 having a single-layered structure that are adjacent to each other.

If the second light blocking sheet 21 has a double-layered structure including the first light blocking layer 20a that is a single-sided adhesive tape and the second light blocking layer 20b that is a double-sided adhesive tape and a light blocking sheet obtained by integrating the first light blocking sheet 20 and the second light blocking sheet 21 is used, there is a possibility that wrinkles occur in the optical sheet (the diffusion sheet 14 and the prism sheet 15) that is adhered to the light blocking sheet due to a difference in coefficient of thermal expansion between the single-sided adhesive tape and the double-sided adhesive tape.

On the other hand, in the planar illumination device 1 according to the embodiment, arranging the second light blocking sheet 21 having a single-layered structure on three of the four circumferential sides curbs occurrence of stress associated with a change in the environment in which the device is used. Even when a stress occurs in the first light blocking sheet 20 and the second light blocking sheet 21 having different coefficients of thermal expansion due to a change in the environment in which the device is used, the slit 2 formed between the first light blocking sheet 20 and the second light blocking sheet 21 attenuates the stress.

Accordingly, the planar illumination device 1 according to the embodiment is able to curb occurrence of wrinkles in the prism sheet 15 and the diffusion sheet 14 that are adhered to the housing 10 and to the first light blocking sheet 20 and the second light blocking sheet 21 and maintain the illumination characteristics for a long time.

As described above, in the planar illumination device 1 according to the embodiment, the slit 2 is crank-shaped and accordingly the path between the first light blocking sheet 20 and the second light blocking sheet 21 has a maze structure, which prevents light from leaking from the slit 2.

Furthermore, dust attaches to the first light blocking sheet 20 and the second light blocking sheet 21 in the path of the slit 2 and accordingly it is possible to prevent the dust from entering the housing 10. The slit 2 may have a shape of maze more complicated than the path between the first light blocking sheet 20 and the second light blocking sheet 21.

As described above, in the planar illumination device 1 according to the embodiment, the thickness D of the second light blocking sheet 21 is made approximately equal to the sum of the thicknesses of the first light blocking layer 20a and the second light blocking layer 20b (d1+d2), which increases the thickness of the adhesive layer in the second light blocking sheet 21 and thus increases the adhesive strength of the second light blocking sheet 21.

As described above, in the planar illumination device 1 according to the embodiment, providing the frame member 51 on the inner side surfaces of the housing body 50 other than the inner side surface opposed to the LEDs 11 increases the thickness of the side walls 10b of the housing 10 other than the side wall 10b opposed to the LEDs 11 to a thickness larger than that of the side wall 10b of the housing 10 opposed to the LEDs 11.

As described above, setting the frame member 51 makes it possible to increase the thickness of the side walls 10b of the housing 10 other than the side wall 10b opposed to the LEDs 11 and thus increase the area of contact with the second light blocking sheet 21. Note that, as there is a limit on increasing the area of contact due to a demand for a slim bezel, increasing the adhesion strength by increasing the thickness of the adhesive layer in the second light blocking sheet 21 is effective.

In the above-described embodiment, the thickness of the side walls 10b of the housing 10 is increased by setting the frame member 51. Alternatively, the thickness of the frame of the housing body 50 may be increased by the thickness of the frame member 51 without providing the frame member 51. Alternatively, slim bezel may be promoted without increasing the thickness of the frame of the housing body 50.

Furthermore, as described above, in the planar illumination device 1 according to the embodiment, the first light blocking layer 20a covers the end of the diffusion sheet 14 on the light incident side surface 40c and accordingly the level at which the top surface of the first light blocking layer 20a is positioned is approximately equal to the level at which the top surface of the raised prism sheet 15 is positioned. In other words, in the planar illumination device 1 according to the embodiment, the first light blocking layer 20a does not overlap the prism sheet 15. Accordingly, it is possible to reduce the thickness of the device by the thickness of the first light blocking layer 20a.

Figure 6A:
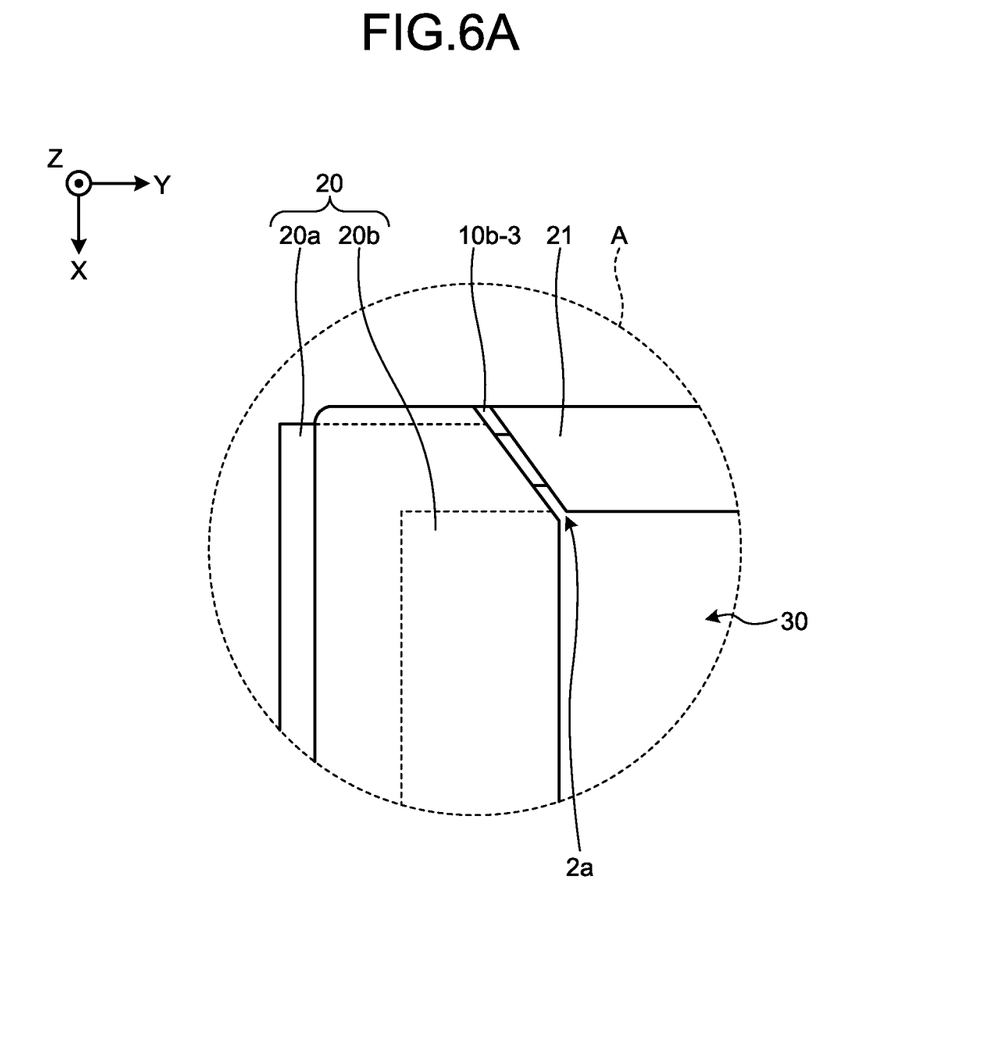
FIG. 6A is a plane view illustrating Modification 1 of the slit according to the embodiment.
Figure 6B:
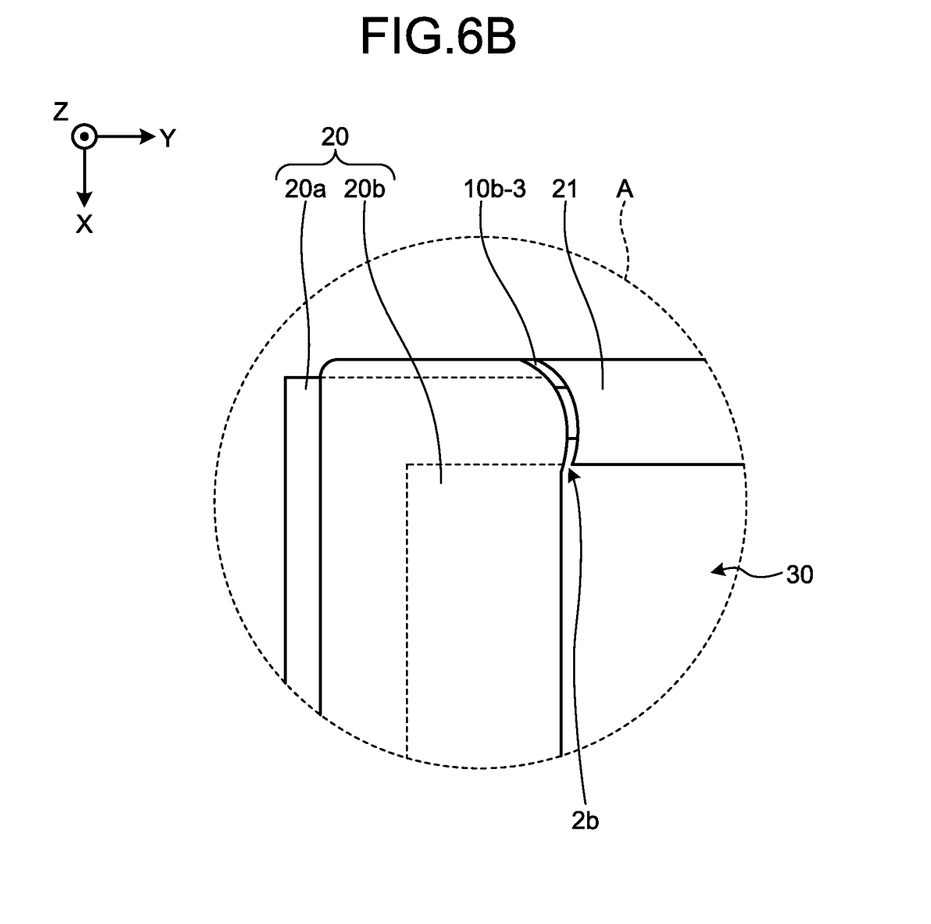
FIG. 6B is a plane view illustrating Modification 2 of the slit according to the embodiment.

With reference to FIGS. 6A and 6B, a modification of the slit 2 will be described. FIG. 6A is a plane view illustrating Modification 1 of the slit 2 according to the embodiment. FIG. 6B is a plane view illustrating Modification 2 of the slit 2 according to the embodiment. The components having the same functions as those of the components illustrated in FIG. 4 will be denoted with the same reference numbers as those represented in FIG. 4 and descriptions thereof will be omitted.

As illustrated in FIG. 6A, a slit 2a according to Modification 1 has a liner shape when viewed from the top. Specifically, the slit 2a has a linear shape leaning to the Y-axis positive direction from a corner of the second light blocking layer 20b on the Y-axis positive direction side toward the effective area 30.

In the embodiment, the slit 2a is formed into a linear shape leaning in the Y-axis positive direction from a corner of the second light blocking layer 20b on the Y-axis positive direction side toward the effective area 30, that is, the slit 2a is inclined to the direction opposite to the direction in which light emitted from the light emitting surfaces 11a of the LEDs 11 travels (the Y-axis positive direction), to prevent the light from leaking to the outside of the housing 10.

Furthermore, as illustrated in FIG. 6B, a slit 2b according to Modification 2 has a curved shape when viewed from the top. Specifically, the slit 2b has a curved shape that curves in an arc shape from a corner of the second light blocking layer 20b on the Y-axis positive direction side toward the effective area 30.

In the embodiment, the slit 2b has the curved shape when viewed from the top and accordingly, when the slit 2a opposed to the outer side surface 10b-2 of the side wall 10b of the housing 10 is viewed, the light guide plate 40 in the effective area 30 cannot be seen and thus light is prevented from leaking.

As described above, in the planar illumination device 1 according to the embodiment, the slit 2a or 2b has a linear shape or a curved shape and accordingly it is possible to prevent light from leaking from the slit 2a or 2b and prevents dust from entering.

A path may be formed between the first light blocking sheet 20 and the second light blocking sheet 21 as a slit according to another modification by combining a linear shape and a curved shape. Such an embodiment also makes it possible to prevent light from leaking and prevent dust from entering.

Furthermore, if the area is one to which the liquid crystal display device cannot be adhered directly, part of the first light blocking sheet 20 and part of the second light blocking sheet 21 are overlapped so as not to form any slit.

Specific detailed descriptions will be given below with reference to FIG. 5. When the surface on which the liquid crystal display device is placed does not reach the top surface of the first light blocking sheet 20, the end of the second light blocking sheet 21 on the light incident side surface 40c may be raised onto part of the top surface of the first light blocking sheet 20 on the side wall 10b of the housing 10 along the Y-axis direction.

In this case, no slit is formed between the first light blocking sheet 20 and the second light blocking sheet 21; however, the first light blocking sheet 20 and the second light blocking sheet 21 are members having different structures and this curves occurrence of stress associated with the environment in which the device is used.

Accordingly, also in this case, it is possible to curb occurrence of wrinkles in the prism sheet 15 and the diffusion sheet 14 that are adhered to the housing 10 and to the first light blocking sheet 20 and the second light blocking sheet 21 and thus maintain the illumination characteristics for a long time as in the above-described case.

Figure 7:
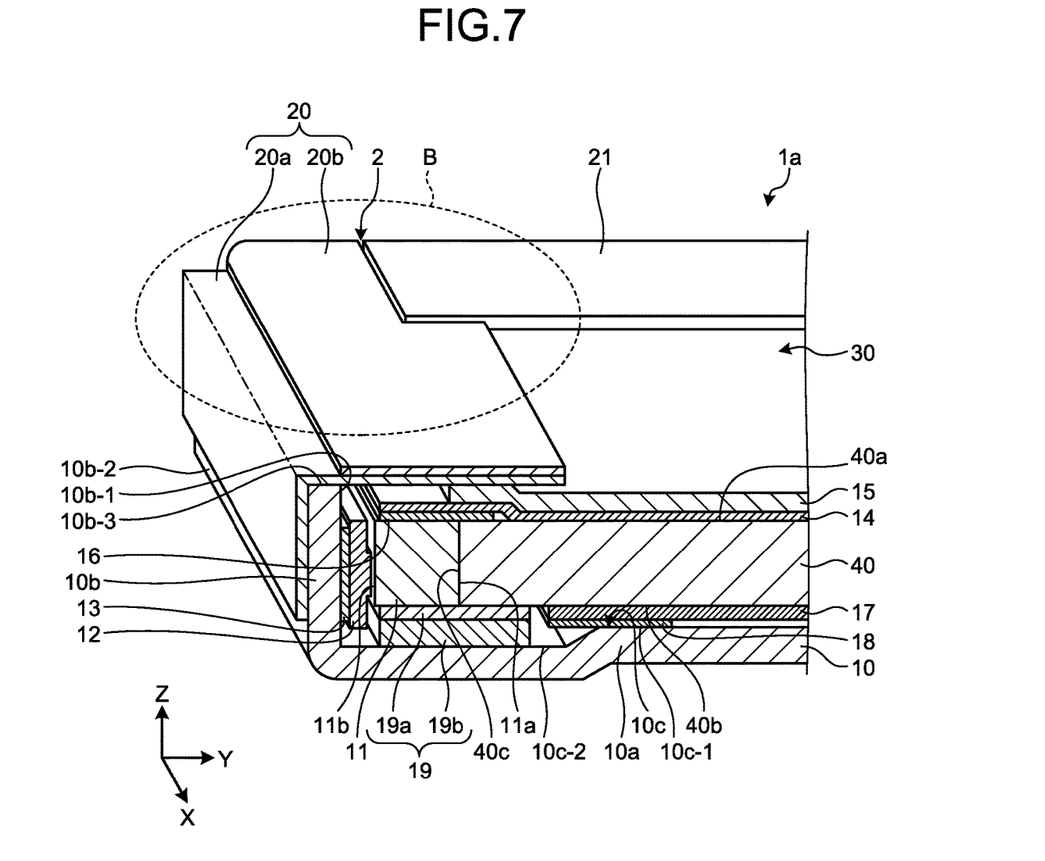
FIG. 7 is a cross-sectional perspective view of a planer illumination device according to another embodiment.
Figure 8:
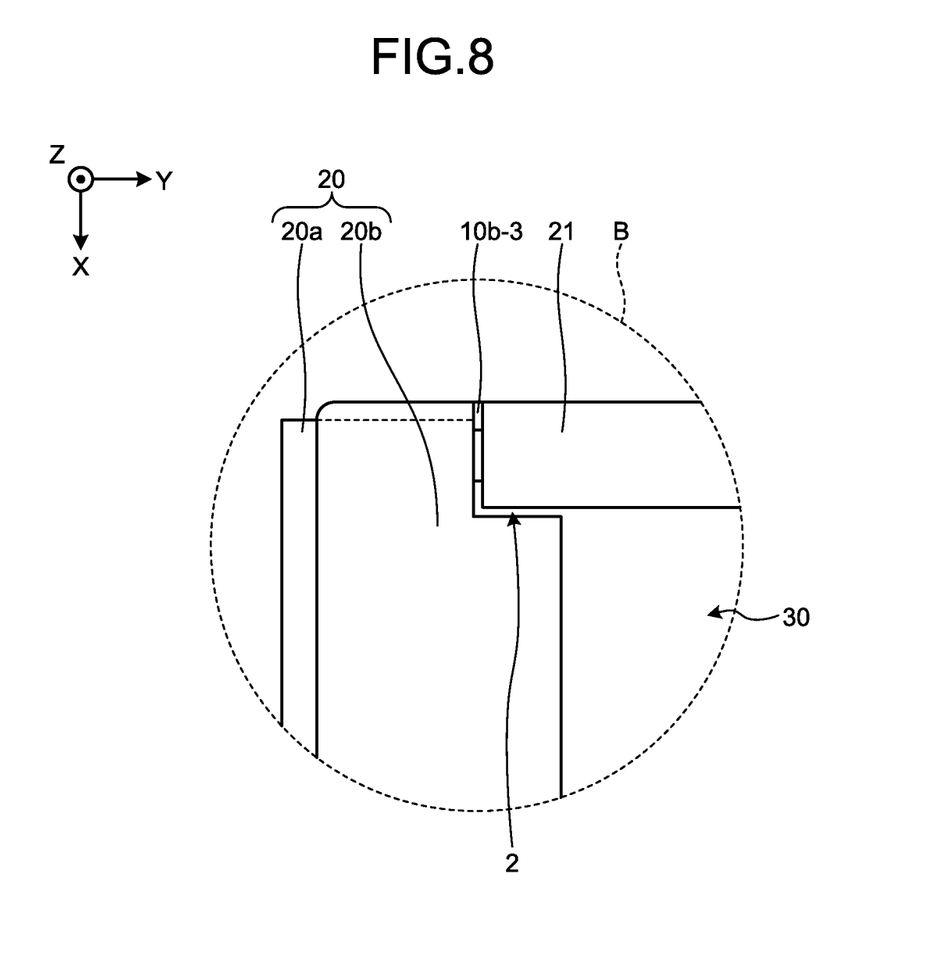
FIG. 8 is an enlarged plane view of the part B illustrated in FIG. 7.

With reference to FIGS. 7 and 8, a planar illumination device 1a according to another embodiment will be described. FIG. 7 is a cross-sectional perspective view of the planer illumination device 1a according to the other embodiment and FIG. 8 is an enlarged plane view of the part B illustrated in FIG. 7. The components having the same functions as those of the components illustrated in FIG. 2 will be denoted with the same reference numerals represented in FIG. 2 and descriptions thereof will be omitted.

The planar illumination device 1a according to the other embodiment have approximately the same configuration as that of the planar illumination device 1 illustrated in FIG. 2 except that the end of the first light blocking layer 20a on the side of the effective area 30 is extended to the end of the second light blocking layer 20b on the side of the effective area 30.

Specifically, as illustrated in FIG. 7, the first light blocking layer 20a implements covering from the outer side surface 10b-2 of the side wall 10b opposed to the surfaces of the LEDs 11 along the X-axis direction over the top surfaces of the LEDs 11 and part of the top surface of the light guide plate 40 in the width direction of the LEDs 11 and the light guide plate 40 in the X-axis direction. The first light blocking layer 20a covers the ends of the diffusion sheet 14 and the prism sheet 15 on the side of the light incident side surface 40c.

As illustrated in FIG. 8, the end of the first light blocking layer 20a on the side of the effective area 30 is aligned with the end of the second light blocking layer 20b on the side of the effective area 30. In other words, simultaneously cutting off the ends of the first light blocking layer 20a and the second light blocking layer 20b overlapping each other on the side of the effective area 30 aligns the cutting surfaces of the end of the first light blocking layer 20a on the side of the effective area 30 and the end of the second light blocking layer 20b on the side of the effective area 30.

As described above, in the planar illumination device 1a according to the other embodiment, the two layers that are the first light blocking layer 20a and the second light blocking layer 20b cover the entire top surfaces of the LEDs 11 and part of the top surface of the light guide plate 40.

As described above, the two layers that are the first light blocking layer 20a and the second light blocking layer 20b cover the entire top surfaces of the LEDs 11 and part of the light guide plate 40, thereby steadily preventing light from leaking from the slit 2 and preventing dust from entering.

The above-described embodiment illustrates the LEDs 11 that are top-view LEDs; however, the LEDs 11 are not limited to top-view LEDs. The LEDs 11 may be side-view LEDs in which an FPC on which LEDs 11 are mounted is orthogonal to the light emitting surfaces 11a.

Instead of the LEDs 11 that are multiple dot light sources, a light source (linear light source) formed linearly and including the integrated LEDs 11 may be used. Specifically, for example, a linear light source in which multiple LED chips are mounted on an elongated substrate and the entire LED chips are covered with sealing resin may be used. In this case, an LED chip may be replaced with the light source according to the invention.

According to an as aspect of the present invention, it is possible to maintain illumination characteristics.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A planar illumination device comprising:
    a light source;
    a light guide plate including a light incident side surface on which the light source is arranged;

a housing that includes side walls surrounding outer circumferential surfaces of the light source and the light guide plate;
a first light blocking sheet that is adhered to an outer side surface and a top end surface of a side wall opposed to the light source among the side walls and that covers the top end surface, a top surface of the light source, and a part of a top surface of the light guide plate; and
a second light blocking sheet that is adhered to top end surfaces of the side walls other than the side wall to which the first light blocking sheet is adhered and that covers at least the top end surfaces,
wherein the first light blocking sheet includes a first light blocking layer that extends from the outer side surface of the side wall to which the first light blocking layer is adhered toward a side wall opposed to the side wall to which the first light blocking layer is adhered; and a second light blocking layer that extends from a part of a top surface of the first light blocking layer toward a side wall opposed to the side wall on which the first light blocking layer is adhered.

2. The planar illumination device according to claim 1, wherein the first light blocking layer extends from the outer side surface of the side wall to which the first blocking layer is adhered to a part of the top surface of the light source.

3. The planar illumination device according to claim 1, wherein a slit is formed between the first light blocking sheet and the second light blocking sheet.

4. The planar illumination device according to claim 3, wherein the slit is crank-shaped when viewed from the top.

5. The planar illumination device according to claim 1, wherein
the first light blocking layer is a single-sided adhesive tape, and
the second light blocking layer and the second light blocking sheet are double-sided adhesive tapes.

6. The planar illumination device according to claim 1, wherein
the second light blocking sheet has a thickness that is approximately equal to the thickness of an area of the first light blocking sheet where the first light blocking layer and the second light blocking layer overlap each other.

7. A planar illumination device comprising:
a light source;
a light guide plate including a light incident side surface on which the light source is arranged;
a housing that includes side walls surrounding outer circumferential surfaces of the light source and the light guide plate;
a first light blocking sheet that is adhered to an outer side surface and a top end surface of a side wall opposed to the light source among the side walls and that covers the top end surface, a top surface of the light source, and a part of a top surface of the light guide plate; and
a second light blocking sheet that is adhered to top end surfaces of the side walls other than the side wall to which the first light blocking sheet is adhered,
wherein the first light blocking sheet and the second light blocking sheet have different layer structures.

8. The planar illumination device according to claim 7, wherein
the first light blocking sheet includes:
a first light blocking layer; and
a second light blocking layer that covers at least a part of a top surface of the first light blocking layer.

9. The planar illumination device according to claim 8, wherein the first light blocking layer extends from the outer side surface of the side wall to which the first blocking layer is adhered to a part of the top surface of the light source.

10. The planar illumination device according to claim 7, wherein a slit is formed between the first light blocking sheet and the second light blocking sheet.

11. The planar illumination device according to claim 10, wherein the slit is crank-shaped when viewed from the top.

12. The planar illumination device according to claim 8, wherein
the first light blocking layer is a single-sided adhesive tape, and
the second light blocking layer and the second light blocking sheet are double-sided adhesive tapes.

13. The planar illumination device according to claim 8, wherein
the second light blocking sheet has a thickness that is approximately equal to the thickness of an area of the first light blocking sheet where the first light blocking layer and the second light blocking layer overlap each other.

* * * * *